United States Patent
Lee et al.

(10) Patent No.: US 7,391,946 B2
(45) Date of Patent: Jun. 24, 2008

(54) LOW ATTENUATION OPTICAL FIBER AND ITS PRODUCING METHOD IN MCVD

(75) Inventors: Chan-Joo Lee, Seoul (KR); Ki-Wan Jang, Seoul (KR); Young-Beom Seo, Seoul (KR)

(73) Assignee: LS Cable Ltd., Seoul (KR)

( * ) Notice: Subject to any disclaimer, the term of this patent is extended or adjusted under 35 U.S.C. 154(b) by 0 days.

(21) Appl. No.: 11/630,051

(22) PCT Filed: Jul. 7, 2004

(86) PCT No.: PCT/KR2004/001669

§ 371 (c)(1),
(2), (4) Date: Dec. 18, 2006

(87) PCT Pub. No.: WO2006/001555

PCT Pub. Date: Jan. 5, 2006

(65) Prior Publication Data

US 2008/0050079 A1      Feb. 28, 2008

(30) Foreign Application Priority Data

Jun. 28, 2004   (KR)   ................. 10-2004-0049153

(51) Int. Cl.
*G02B 6/02* (2006.01)
*C03B 37/018* (2006.01)

(52) U.S. Cl. .................. 385/123; 65/417; 65/426; 65/530

(58) Field of Classification Search ............... None
See application file for complete search history.

(56) References Cited

U.S. PATENT DOCUMENTS

| 5,123,940 | A | * | 6/1992 | DiGiovanni et al. | .......... 65/395 |
| 5,259,856 | A | * | 11/1993 | Ohga et al. | .................. 65/426 |
| 7,028,508 | B2 | * | 4/2006 | Fabian et al. | ................. 65/414 |
| 2004/0261461 | A1 | * | 12/2004 | Lee et al. | ..................... 65/419 |

FOREIGN PATENT DOCUMENTS

| JP | 60-11240 A | 1/1985 |
| JP | 2808857 B2 | 7/1998 |
| KR | 2004-40997 A | 5/2004 |
| WO | WO 2004026779 A1 * | 4/2004 |

* cited by examiner

*Primary Examiner*—Tina M Wong
(74) *Attorney, Agent, or Firm*—Jones Day

(57) ABSTRACT

Disclosed is a low-attenuation single-mode optical fiber having a photoconductive core and a clad, which shows very low OH concentration in MFD (Mode Field Diameter) region. The optical fiber includes a core positioned at its center for photoconduction, and a dehydrated clad and a base clad which are coated on the clad in order. The dehydrated clad has a substantially identical refractive index to the base clad. A refractive index of the core is greater than those of the dehydrated clad and the base clad. The dehydrated clad has a relatively lower OH concentration than the base clad. The region composed of the core and the dehydrated clad has an MFD region at which OH concentration is less than 0.8 ppb.

13 Claims, 8 Drawing Sheets

LOW ATTENUATION OPTICAL FIBER AND ITS PRODUCING METHOD IN MCVD

TECHNICAL FIELD

The present invention relates to an optical fiber including a photoconductive core and a clad, and more particularly to a low attenuation optical fiber having remarkably low concentration of hydroxyl groups in a core region and a part of clad region that correspond to MFD (Mode Field Diameter).

BACKGROUND ART

MCVD (Modified Chemical Vapor Deposition) is one of methods for manufacturing optical fibers. In MCVD, a clad is firstly formed and then a core is formed in the clad.

Referring to FIG. 1 for describing the conventional MCVD more specifically, a quartz tube 1 is put on headstocks of a lathe, and then a soot forming gas such as $SiCl_4$, $GeCl_4$ and $POCl_3$ is introduced into the tube 1 together with oxygen gas while the tube 1 is rotated. At the same time, a torch 2 for providing a temperature above 1600° C. is reciprocated along an axial direction of the tube 1 so that the soot forming gas introduced into the tube 1 may be sufficiently reacted.

Whenever the torch 14 reciprocates, oxidation of halide gas is induced as expressed in the following Reaction Formula 1 at a region in the tube 1 that is heated up to a reaction temperature, so fine glass particles (hereinafter, referred to as 'soot') 3 are generated. While the torch 2 is moving, the soot 3 is deposited on the inner surface of the tube 1 by means of thermophoresis at a region that has a relatively lower temperature than the region heated by the torch 2.

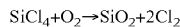

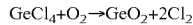 Reaction Formula 1

The layer of soot 3 deposited on the inner surface of the tube 1 is sintered by the heat of the torch 2 adjacently followed and becomes a transparent glass layer. This process is continuously repeated so that a plurality of clad layers are formed on the inner side of the tube 1 and a plurality of core layers are subsequently formed on the clad layer. FIG. 2 shows a section of the optical fiber preform produced by the aforementioned process. In FIG. 2, reference numeral 5 denotes a core, 6 denotes a clad, 7 denotes a tube, 8 denotes a diameter of the core, and 9 denotes a diameter of the clad.

In the conventional MCVD however, while a plurality of clad layers and core layers are formed, there occurs a problem that hydroxyl groups (OH) are included therein as impurities. In fact, the soot forming gas flowed into the tube 1 generally contains a small amount of moisture as impurities, and this moisture is adsorbed on the surface of the deposition layer formed inside the tube 1 and then dispersed into the deposition layer under the high temperature, thereby causing bond of Si and OH. FIG. 3 shows an interatomic bond structure of the sintered soot deposition layer in case of the conventional optical fiber preform producing process using MCVD. Referring to FIG. 3, it would be found that a large amount of hydroxyl groups (OH) and Si are bonded therein.

However, since the depositing and sintering of the soot 3 are achieved substantially at the same time using the torch 2 in the MCVD according to the prior art, the removal of hydroxyl groups (OH) included in the clad layer or the core layer as impurities is substantially not possible unless a dehydration process is separately conducted. It is because the hydroxyl groups (OH) included as impurities in the soot 3 through chemical reaction are stably bonded to Si and thus stay in the soot 3 though the MCVD process is conducted at a high temperature.

Meanwhile, an optical loss, which is the most essential feature for optical fibers, is composed of a Rayleigh scattering loss caused by the difference of density and constitution of an optical fiber preform, an ultraviolet absorption loss according to electronic transition energy absorption in an atom level, an infrared absorption loss according to energy absorption during lattice vibration, a hydroxyl group absorption loss due to vibration of hydroxyl groups (OH), and a macroscopic bending loss.

The optical loss should be lowered in order to ensure reliable signal transmission through optical fibers. An optical fiber generally has an optical loss lower than a predetermined level in the wavelength range between 1100 nm and 1700 nm, so two wavelengths of 1310 nm and 1550 nm are currently used as main wavelength ranges for optical communication. In addition, the optical loss due to the hydroxyl group (OH) absorption is particularly considered as a significant factor at the wavelength 1385 nm rather than in other wavelengths, and this wavelength is at present not used due to the high optical loss caused by the hydroxyl group (OH) absorption. Thus, in order to use all of the wavelength range from 1310 nm to 1550 nm, an average optical loss caused by the hydroxyl group (OH) in the optical fiber at the wavelength 1385 nm should be lower than that of 1310 nm (0.34 dB/Km on average). Since the core composed of germanium dioxide and silicon dioxide has a Rayleigh loss of about 0.28 dB/Km caused by the density and constitution difference of the core material itself, the optical fiber can be used in the wavelength range from 1310 nm to 1550 nm only when the optical loss caused by hydroxyl groups (OH) is controlled to 0.06 dB/Km or below. For this purpose, the production of the optical fiber preform should be also controlled so that the concentration of hydroxyl groups (OH) in the optical fiber is not more than 0.8 ppb. However, when just two hydroxyl groups exist on the surface of a particle with a diameter of 0.1 μm, the concentration of hydroxyl group comes up to 30 ppb and this concentration may be converted into an optical loss of even 0.75 dB/Km. This fact shows that it is very difficult to control the concentration of hydroxyl groups (OH) contained in the optical fiber preform as impurities in the level of not more than 0.8 ppb in the conventional MCVD.

It is known that making an OH-free single mode optical fiber is possible in OVD (Outside Vapor Deposition) as disclosed in U.S. Pat. No. 3,737,292, U.S. Pat. No. 3,823,995 and U.S. Pat. No. 3,884,550, or in VAD (Vapor Axial Deposition) as disclosed in U.S. Pat. No. 4,737,179 and U.S. Pat. No. 6,131,415.

However, different to OVD and VAD, the conventional MCVD executes the deposition process and the sintering process at the same time, so soot is simultaneously melted and condensed while the soot is formed. Thus, in the optical fiber produced by the conventional MCVD, Si—OH included in the glass layer condensed due to the sintering causes a critical hydroxyl group (OH) absorption loss at the wavelength 1385 nm. Accordingly, the optical fiber drawn from the preform produced by the conventional MCVD has a limitation in the usable optical communication wavelength range.

Japanese Laid-open Publication S63-315530 discloses a method for producing an optical fiber preform, which includes the steps of accumulating metal oxide fine particles including $SiO_2$ on an inner wall of a quartz tube to form a porous accumulative layer, flowing a dehydrating agent into the quartz tube with the porous accumulative layer to dehydrate the porous accumulative layer, making the porous accumulative layer into a transparent glass with flowing the dehydrating agent into the quartz tube, and condensing the quartz tube filled with the dehydrating agent.

S63-315530 conducts the dehydration process after the clad layer and the core layer are all accumulated in the quartz tube, so it is difficult to completely remove all hydroxyl groups (OH) existing in the deposition layer if the deposition layer (particularly, the core layer) is thick.

That is to say, S63-315530 is not suitable for producing an optical fiber having a larger preform and appropriate to common optical communication systems (particularly, CWDM) requiring the lowest absorption loss at 1385 nm.

In addition, the conventional dehydration process was directed to removing hydroxyl groups existing in the core layer. However, light passes through a part of the clad layer as well as the core layer. Thus, in order to reduce the absorption loss caused by hydroxyl groups to the minimum, it is needed to dehydrate all regions in MFD (Mode Field Diameter).

DISCLOSURE OF INVENTION

When an optical fiber preform is produced using MCVD as disclosed in S63-315530, dehydration reaction is not sufficiently made inside the deposition layer if the clad layer or the core layer is thick, thereby deteriorating the efficiency of removing hydroxyl groups (OH) existing in the core layer. Inventors have found that hydroxyl groups (OH) in a core layer may be substantially perfectly removed when at least one core layer (or, clad layer) is deposited in a quartz tube and a dehydration process is independently conducted whenever each of core layers (or, clad layers) is deposited, so as to solve the above problem.

Therefore, an object of the invention is to provide a method of producing an optical fiber preform using MCVD, which may substantially remove hydroxyl groups (OH) existing in a core or clad layer regardless of the thickness of a deposition layer in the quartz tube.

Another object of the invention is to provide a method of dehydrating a region within MFD (Mode Field Diameter) through which light substantially passes.

Still another object of the invention is to provide an optical fiber in which hydroxyl groups (OH) existing in the MFD region are removed.

In one aspect of the invention, the present invention provides a method for producing an optical fiber preform in which hydroxyl groups (OH) existing in a corresponding MFD region of the preform corresponding to an MFD region of an optical fiber are removed using MCVD.

In more detail, the method for producing an optical fiber preform according to the present invention includes:

(a) forming at least one base clad layer by depositing soot including $SiO_2$ and $GeO_2$ on an inner wall of a quartz tube and heating the quartz tube with the soot deposited at a high temperature;

(b) forming at least one dehydrated clad layer with a refractive index substantially identical to that of the base clad layer by repeating the following steps at least once:

an accumulation step for introducing a soot forming gas into the quartz tube together with a carrier gas and heating an inside of the quartz tube to a temperature of 1000° C. to 1400° C. to generate soot including $SiO_2$ and $GeO_2$, and then accumulating the soot on the base clad layer;

a dehydration step for introducing a dehydration gas into the quartz tube and heating the inside of the quartz tube to a temperature of 600° C. to 1200° C. to remove hydroxyl groups (OH) and moisture in the soot and the quartz tube; and a sintering step for heating the inside of the quartz tube with the soot deposited at a temperature higher than 1700° C. so that the soot is sintered and vitrified, (c) forming at least one core layer with a relatively higher refractive index on the clad layer by repeating the following steps at least once:

an accumulation step for introducing a soot forming gas into the quartz tube together with a carrier gas and heating the inside of the quartz tube to a temperature of 1000° C. to 1400° C. to generate soot, and then accumulating the soot on the dehydrated clad layer;

a dehydration step for introducing a dehydration gas into the quartz tube and heating the inside of the quartz tube to a temperature of 600° C. to 1200° C. to remove hydroxyl groups (OH) and moisture in the soot and the quartz tube; and a sintering step for heating the inside of the quartz tube with the soot deposited at a temperature higher than 1700° C. so that the soot is sintered and vitrified.

At this time, a dehydration region composed of the dehydrated clad layer and the core layer preferably includes a corresponding MFD (Mode Field Diameter) region of the preform corresponding to an MFD region of an optical fiber, and it is more preferable that the dehydration region is substantially a corresponding MFD region of the preform corresponding to an MFD region of an optical fiber.

In another aspect of the invention, there is also provided a method for producing an optical fiber, which includes collapsing the optical fiber preform produced using the method defined in claim 1 to form a preform rod; and drawing the preform rod into an optical fiber.

In still another aspect of the invention, there is also provided a single-mode optical fiber including a core positioned at a central axis for photoconduction, and a dehydrated clad and a base clad subsequently coated on the core, wherein the dehydrated clad and the base clad have substantially identical refractive index, and the core has a refractive index greater than the dehydrated clad and the base clad, wherein the dehydrated clad has concentration of hydroxyl groups relatively lower than the base clad, wherein a region composed of the core and the dehydrated clad includes an MFD region of an optical fiber, and wherein the concentration of hydroxyl groups (OH) in the MFD region of the optical fiber is less than 0.8 ppb.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

The preferred embodiment of this present invention will now be described more fully hereinafter with reference to the accompanying drawings. However, the terms and the vocabularies used herein should not be construed as limited to general and dictionary meanings but as based on the meanings and concepts in accordance with the spirit and scope of the invention on the basis of the principle that the inventor is allowed to define terms as the appropriate concept for the best explanation. Therefore, the description herein should not be construed as limiting the scope of the invention but as merely providing illustrations of some of the presently preferred embodiments of this invention. It will be understood that other variations and modifications could be made thereto without departing from the spirit and scope of the invention.

In a single mode optical fiber, light is propagated through not only a core but also a part of clad. The region through which light substantially propagates as mentioned above is called MFD (Mode Field Diameter).

The following table 1 shows correlation between a core of an optical fiber produced by various manufacturers and MFD.

TABLE 1

| | Manufacturer | | | |
| --- | --- | --- | --- | --- |
| | O | C | S | L |
| MFD(1310 nm) (μm) | 9.2 ± 0.4 | 9.2 ± 0.4 | 9.2 ± 0.4 | 9.2 ± 0.4 |
| Core Diameter (μm) | 8.3 | 8.2 | 8.8 | 8.7 |
| Difference (μm) | 0.9 | 1.0 | 0.4 | 0.5 |

As seen from the above table 1, light also passes through a part of clad, within a range from a core region as much as about 0.4 μm to 1.0 μm. Thus, in order to minimize an absorption loss caused by hydroxyl groups at 1385 nm, it should be noted that a part of clad region corresponding to MFD should be dehydrated together with the core region.

Figure 1:
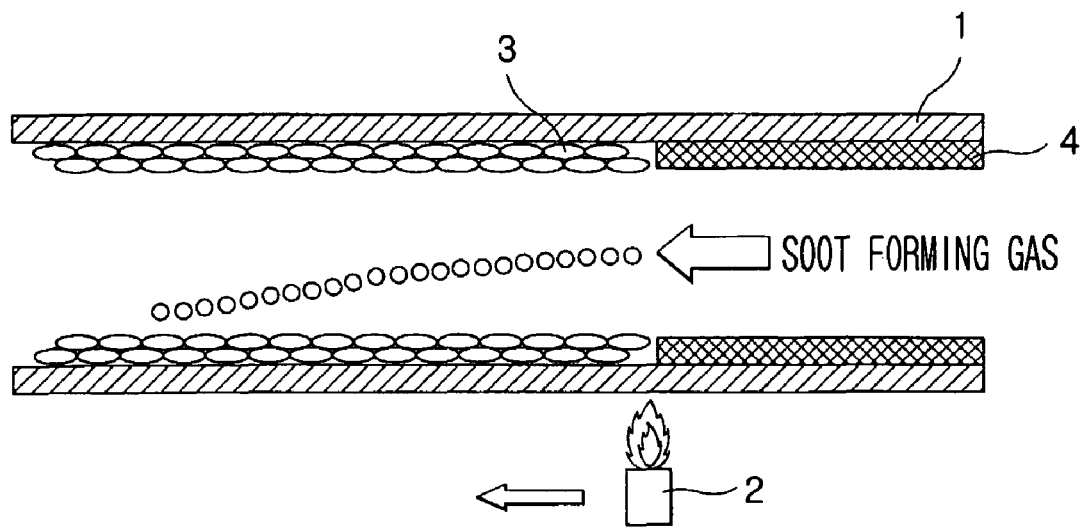
FIG. 1 is a diagram illustrating a method of producing an optical fiber preform using a conventional MCVD (Modified Chemical Vapor Deposition)
Figure 2:
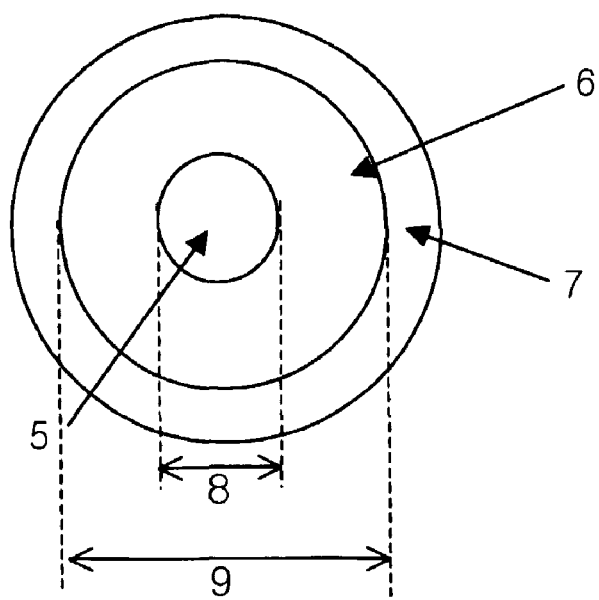
FIG. 2 is a sectional view showing an optical fiber preform produced by the method of FIG. 1.
Figure 3:
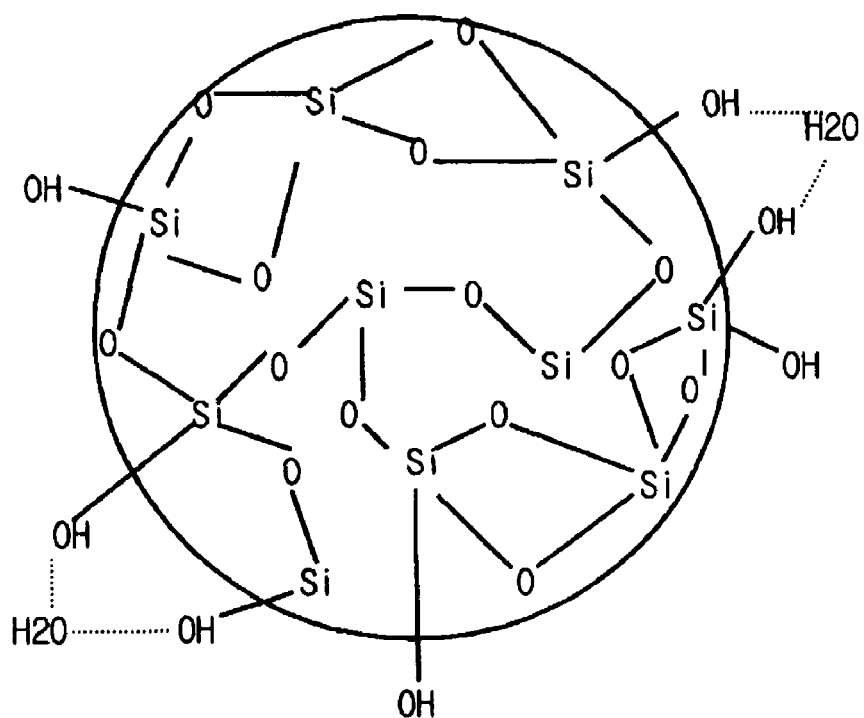
FIG. 3 is a diagram showing that moisture is adsorbed to soot deposited according to the method of FIG. 1.
Figure 4A:
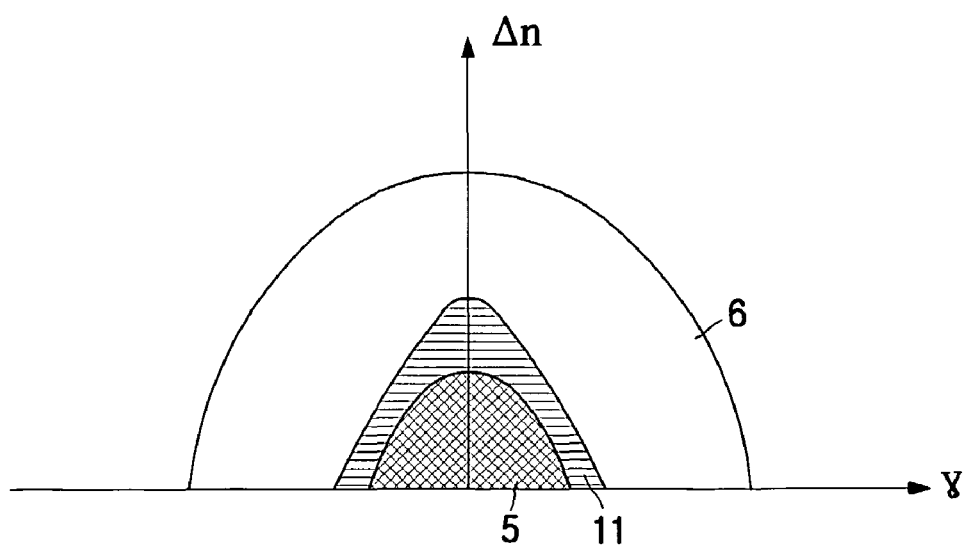
FIG. 4a shows a structure of a conventional optical fiber of which only a core is dehydrated.
Figure 4B:
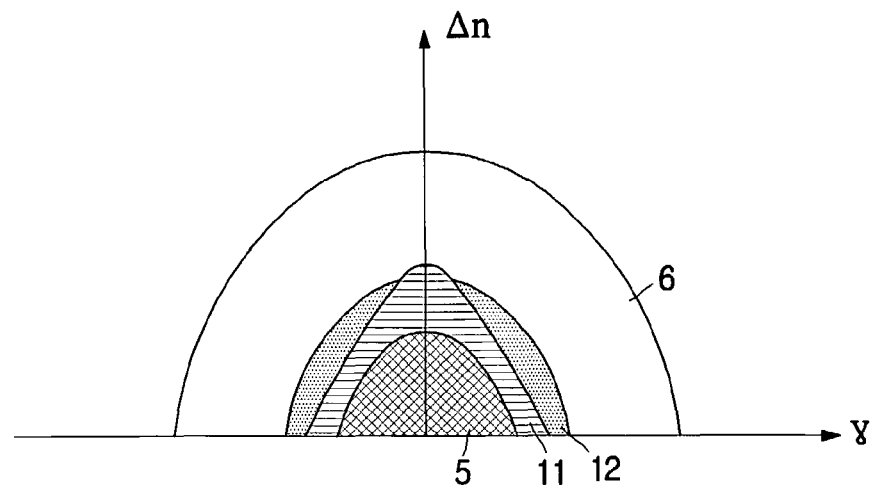
FIG. 4b shows a structure of an optical fiber according to the present invention of which a part of clad corresponding to MFD (Mode Field Diameter) is dehydrated.

FIG. 4a shows an optical fiber of which only a core layer is dehydrated according to the prior art, and FIG. 4b shows an optical fiber of which the core layer and a part of clad layer corresponding to MFD are all dehydrated.

As shown in FIG. 4a, light passes through a partial region 11 of a clad 6 corresponding to MFD as well as a core 5. At this time, if only the core 5 is dehydrated, light may passes through the partial region 11 of the clad 6 and be attenuated due to hydroxyl groups (OH) existing in the partial region 11.

Thus, the optical fiber of the present invention has a lower hydroxyl group concentration in the MFD region rather than in a region out of the MFD region. That is to say, the concentration of hydroxyl groups (OH) in MFD is 0.8 ppb or less.

As shown in FIG. 4b, a dehydrated region 12 of the optical fiber according to the present invention includes the core 5 and the partial region 11 of the clad 6.

Hereinafter, an optical fiber configured as above and a method of producing an optical fiber preform for producing the optical fiber are described with reference to the drawings.

The method of producing an optical fiber preform is briefly composed of a clad layer forming process and a core layer forming process.

The clad layer forming process includes a base clad forming step and a dehydrated clad layer forming step, while the core layer forming process includes a soot deposition step, a dehydration step, and a sintering and vitrifying step.

Hereinafter, the method of the present invention will be described in more detail with reference to FIGS. 5a to 7.

1. Process of Forming a Clad Layer

Hereinafter, the clad layer forming process according to the present invention is described with reference to FIGS. 5a to 5e.

Figure 5A:
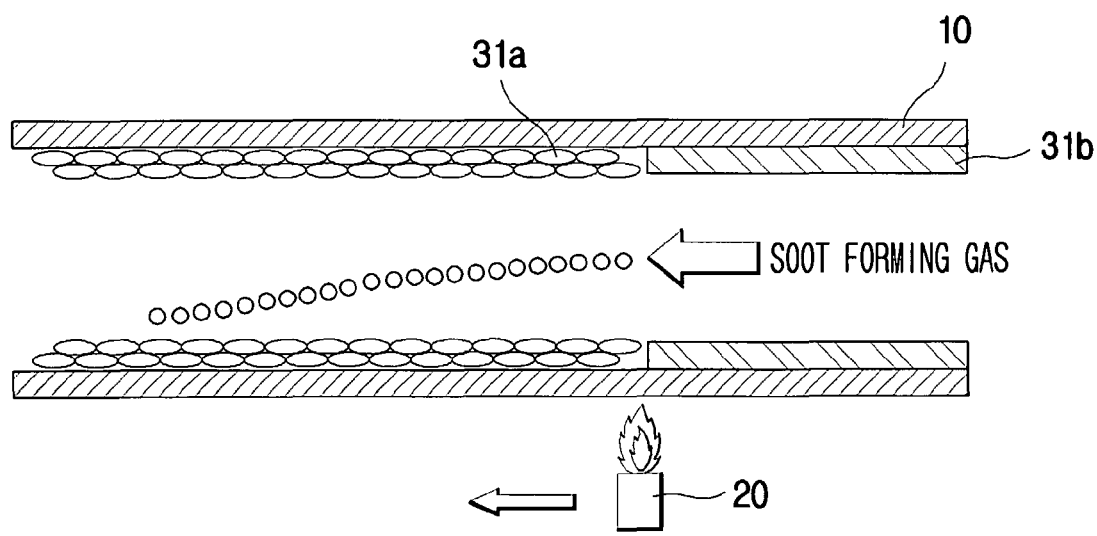
FIGS. 5a to 5e are drawings illustrating the process of forming a clad layer according to a preferred embodiment of the present invention.

(1) Forming a Base Clad Layer (see FIG. 5a)

While a quartz tube 10 with an OH concentration of 500 ppm or less is rotated, a mixture gas including a soot forming gas such as $SiCl_4$, $GeCl_4$ and $POCl_3$ and oxygen gas is blown into the tube and a heat source 20 is used to heat the inside of the quartz tube over 1700° C.

The soot forming gas introduced in an arrow direction of FIG. 5a is oxidized by means of the heat conducted from the surface of the quartz tube to generate soot 30a, and this soot 30a moves in the tube to a relatively lower temperature region and accumulates on an inner wall of the tube by means of thermophoresis.

After at least one layer of clad soot particles 30a is accumulated on the inner wall of the quartz tube 10, the heat tube 20 is moved in an arrow direction of FIG. 5a after the accumulation step so that the soot 30a accumulated on the inner wall is sintered and vitrified to form a sintered layer 30b.

If such accumulation and sintering steps are conducted, one clad layer is formed. Such procedure is continuously repeated until the clad layer has a desired thickness.

At this time, a rotating speed of the quartz tube 10 is preferably 20 rpm to 100 rpm. If the rotating speed of the quartz tube is less than 20 rpm, soot is not accumulated in a uniform thickness. If the rotating speed is more than 100 rpm, accumulation of soot particles is deteriorated.

Here, the heat source 20 preferably moves at a speed of 500 mm/min or less along the length of the quartz tube (see the arrow of FIG. 5a). If the moving speed of the heat source 20 is greater than 500 mm/min, the particles deposited to the inner wall of the tube are not uniformly vitrified to cause distortion on the deposition surface.

(2) Forming a Dehydrated Clad Layer (see FIGS. 5b to 5e)

While a mixture gas including a soot forming gas such as $SiCl_4$, $GeCl_4$ and $POCl_3$ and oxygen gas is blown into the quartz tube 10 in which the base clad layer 31 is formed, and the heat source 20 is used to heat the inside of the quartz tube to the temperature of 1000° C. to 1400° C.

Figure 5B:
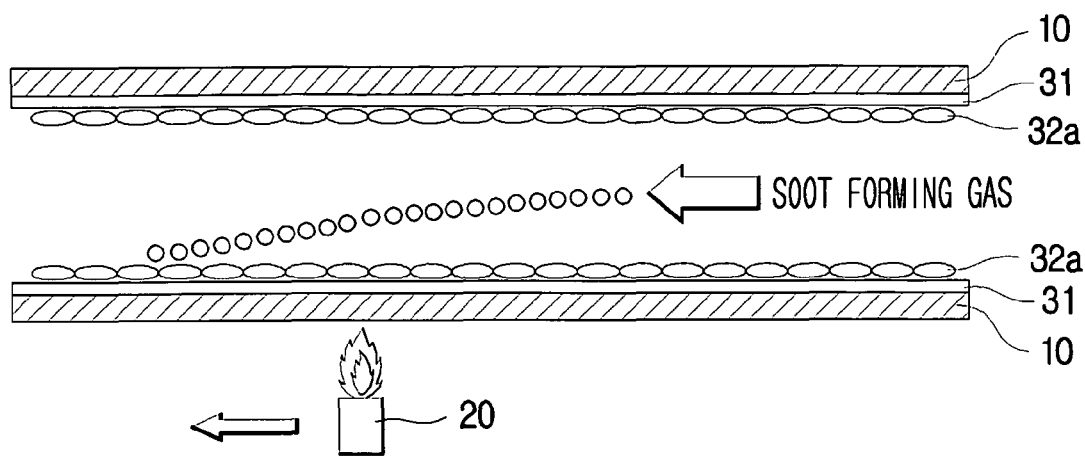

At this time, the heat source 20 preferably moves at a speed of 500 mm/min or less along the length of the quartz tube (see the arrow of FIG. 5b). If the moving speed of the heat source 20 is greater than 500 mm/min, the oxygen gas and the soot forming gas introduced into the tube are not fully reacted, so $SiO_2$ and $GeO_2$ to be used for forming a deposition layer are not sufficiently generated.

The soot forming gas introduced in an arrow direction of FIG. 5b is oxidized by means of the heat conducted from the surface of the quartz tube 10 to generate soot 32a, and this soot 32a moves in the tube to a relatively lower temperature region and accumulates on the base clad layer 31 by means of thermophoresis.

At this time, a rotating speed of the quartz tube 10 is preferably 20 rpm to 100 rpm. If the rotating speed of the quartz tube is less than 20 rpm, soot is not accumulated in a uniform thickness. If the rotating speed is more than 100 rpm, accumulation of soot particles is deteriorated.

Figure 5C:
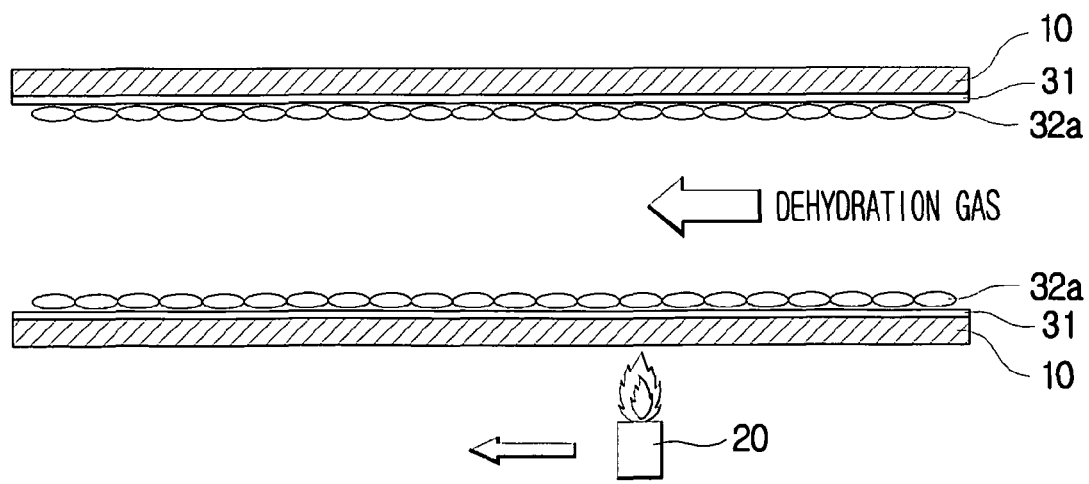

After the soot 32a used for forming a dehydrated clad layer 30a is accumulated on the inner wall of the quartz tube 10, the quartz tube 10 is forwarded to the dehydration step as shown in FIG. 5c.

While a dehydration gas such as He, $Cl_2$ and $O_2$ is put into the quartz tube 10 on which the soot 32a is accumulated, the tube 10 is heated using the heat source 20 that is moved along a direction in which the dehydration gas is put. At this time, the inside of the tube preferably keeps a temperature of 600° C. to 1200° C.

If the temperature in the tube 10 is above 1200° C., the number of particles is decreased as the soot forms a neck, so the particle diameter is increased and pores are disappeared. That is to say, since the rate of dispersion of hydroxyl groups (OH) existing in pores is faster than the rate of growth of soot, the hydroxyl groups (OH) are captured among the soot 32a, not escaping therefrom.

Thus, in order to efficiently evaporate hydroxyl groups (OH) or moisture included in the soot 32a, the base clad layer 31 or the quartz tube 10 and also prevent hydroxyl groups (OH) from being captured therein, it is preferable to keep the dehydration reaction temperature in the range of 600° C. to 1200° C.

In addition, the heat source 20 preferably moves at a speed of 500 mm/min or less along the length of the quartz tube (see the arrow of FIG. 5c). If the moving speed of the heat source 20 is greater than 500 mm/min, the dehydration gas introduced into the tube is not fully reacted with moisture or hydroxyl groups (OH), so the moisture or hydroxyl groups (OH) existing in the soot accumulation layer 32a or the tube 10 is not satisfactorily removed.

The dehydration gas (particularly, $Cl_2$) is reacted with moisture or hydroxyl groups (OH) existing in the soot accumulation layer 32a or the tube 10 according to the dehydration reaction as expressed in the following reaction formula 2.

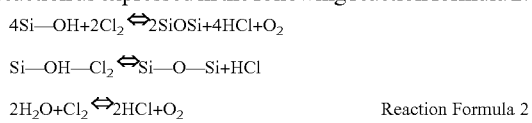

$$4Si\text{—}OH+2Cl_2 \Leftrightarrow 2SiOSi+4HCl+O_2$$

$$Si\text{—}OH\text{—}Cl_2 \Leftrightarrow Si\text{—}O\text{—}Si+HCl$$

$$2H_2O+Cl_2 \Leftrightarrow 2HCl+O_2 \qquad \text{Reaction Formula 2}$$

Figure 5D:
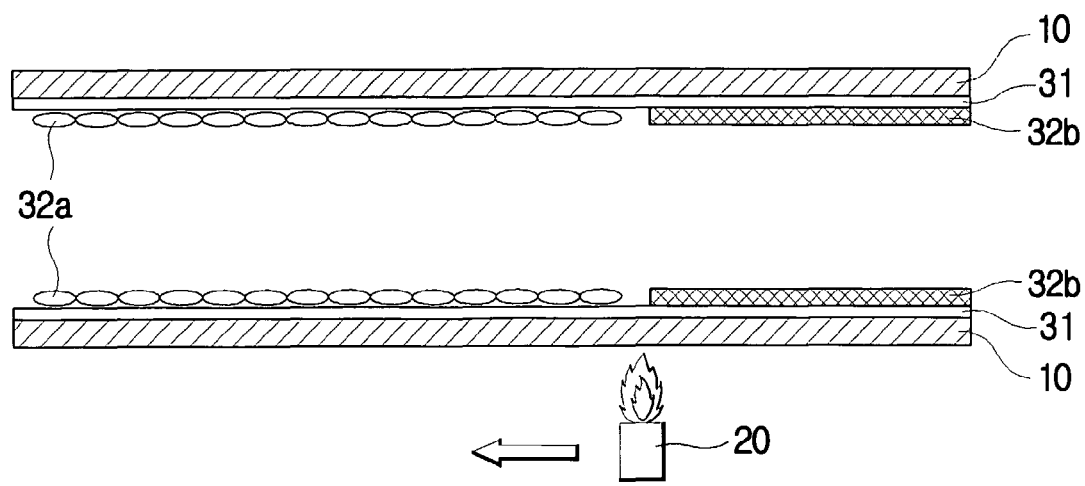
Figure 5E:
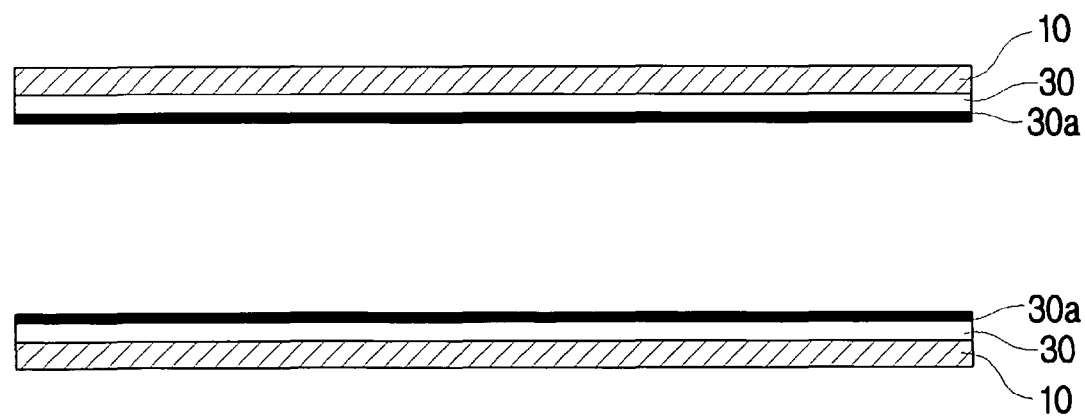

After the dehydration step, the quartz tube 10 experiences the sintering and vitrifying step as shown in FIG. 5d to form a dehydrated clad layer 32b on the base clad layer 31.

That is to say, after the dehydration step is completed, the heat source 20 is moved in an arrow direction of FIG. 5d to keep a temperature of the inside of the tube 10 over 1700° C. so that the soot 32a accumulated on the base clad layer 31 is sintered and vitrified to form a sintered layer 32b.

At this time, the heat source 20 preferably moves at a speed of 500 mm/min or less along the length of the quartz tube (see the arrow of FIG. 5d). If the moving speed of the heat source 20 is greater than 500 mm/min, the particles deposited to the inner wall of the tube are not uniformly vitrified to cause distortion on the deposition surface.

In addition, when the sintering step of FIG. 5d is progressed, it is also possible to put dehydration gas such as He, $Cl_2$ and $O_2$ into the tube so as to additionally remove residual hydroxyl groups (OH) or moisture remained without reaction.

The steps of FIGS. 5b to 5d as mentioned above may be repeated at least once to form at least one dehydrated clad layer on the base clad layer 31. That is to say, in the quartz tube 10, a dehydrated clad layer 30a whose concentration of hydroxyl groups is controlled below 0.8 ppb by means of the dehydration step may be formed on a clad layer 30 that does not experience a dehydration step. The dehydrated clad layer 30a of FIG. 5e becomes a region of the clad corresponding to the MFD region, when being produced into an optical fiber.

Hereinafter, a region of a corresponding optical fiber preform corresponding to a MFD region of an optical fiber is defined as "a corresponding MFD region". This corresponding MFD region has a radius calculated by the following equation 1.

$$R_2 = (R_3 \times r_2)/r_3 \qquad \text{Equation 1}$$

Here, $R_2$ is a radius of a corresponding MFD region of an optical fiber preform, $r_2$ is MFD/2, $R_3$ is an outer diameter of the optical fiber preform, and $r_3$ is an outer diameter of the optical fiber.

Thus, if a radius of a core layer, a radius of a clad layer and MFD of an optical fiber to be produced is designed, the radius of the corresponding MFD region of the preform used for producing the optical fiber may be calculated using the above equation 1. Since the radius of the corresponding MFD region is determined as above, it is possible to design thickness of the base clad layer and the dehydrated clad layer.

2. Process of Forming a Core Layer

Hereinafter, the core layer forming process according to the present invention is described with reference to FIGS. 6a to 6f.

(1) Forming a Base Core Layer

While a mixture gas including a soot forming gas such as $SiCl_4$ and $GeCl_4$ and oxygen gas is blown into the quartz tube 10 on which the clad layer 30 is formed, the heat source 20 is used to heat the inside of the quartz tube to a temperature in the range of 1000° C. to 1400° C.

Figure 6A:
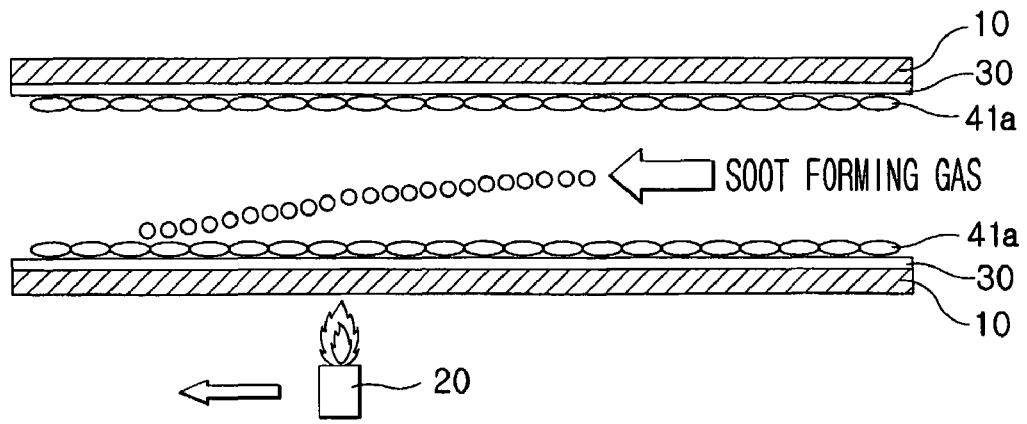
FIGS. 6a to 6f are drawings illustrating the process of forming a core layer according to a preferred embodiment of the present invention.

At this time, the heat source 20 preferably moves at a speed of 500 mm/min or less along the length of the quartz tube (see the arrow of FIG. 6a). If the moving speed of the heat source 20 is greater than 500 mm/min, the oxygen gas and the soot forming gas introduced into the tube are not fully reacted, so $SiO_2$ and $GeO_2$ to be used for forming a deposition layer are not sufficiently generated.

The soot forming gas introduced in an arrow direction of FIG. 6a is oxidized by means of the heat conducted from the surface of the quartz tube 10 to generate soot 41a, and this soot 41a moves in the tube to a relatively lower temperature region and accumulates on the clad layer 30 by means of thermophoresis.

At this time, a rotating speed of the quartz tube 10 is preferably 20 rpm to 100 rpm. If the rotating speed of the quartz tube is less than 20 rpm, soot is not accumulated in a uniform thickness. If the rotating speed is more than 100 rpm, accumulation of soot particles is deteriorated.

Figure 6B:
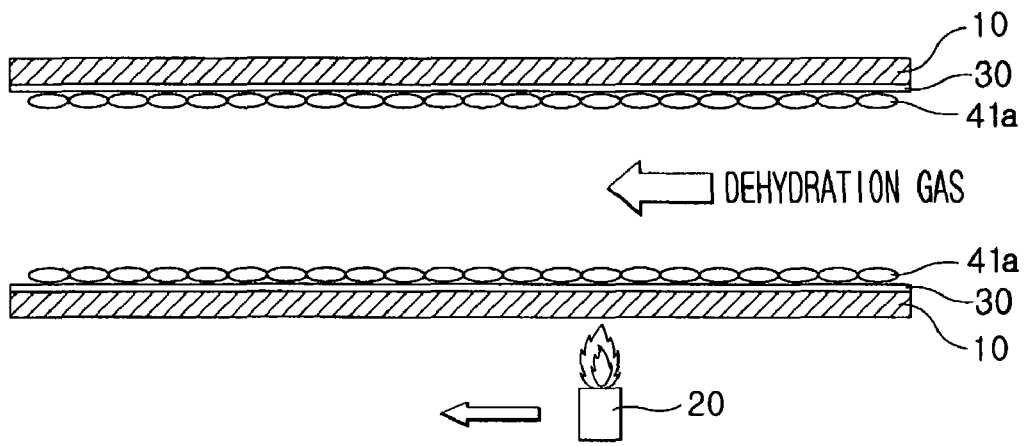

After the soot 41a used for forming a base core layer 41 is accumulated on the quartz tube 10, the quartz tube 10 is forwarded to the dehydration step as shown in FIG. 6b.

While a dehydration gas such as He, $Cl_2$ and $O_2$ is put into the quartz tube 10 on which the soot 41a is accumulated, the tube 10 is heated using the heat source 20 that is moved along a direction in which the dehydration gas is put. At this time, the inside of the tube preferably keeps a temperature of 600° C. to 1200° C.

If the temperature in the tube 10 is above 1200° C., the number of particles is decreased as the soot forms a neck, so the particle diameter is increased and pores are disappeared. That is to say, since the rate of dispersion of hydroxyl groups (OH) existing in pores is faster than the rate of growth of soot, the hydroxyl groups (OH) are captured among the soot 41a, not escaping therefrom.

Thus, in order to efficiently evaporate hydroxyl groups (OH) or moisture included in the soot 41a, the clad layer 30 or the quartz tube 10 and also prevent hydroxyl groups (OH) from being captured therein, it is preferable to keep the dehydration reaction temperature in the range of 600° C. to 1200° C.

In addition, the heat source 20 preferably moves at a speed of 500 mm/min or less along the length of the quartz tube (see the arrow of FIG. 6b). If the moving speed of the heat source 20 is greater than 500 mm/min, the dehydration gas introduced into the tube is not fully reacted with moisture or hydroxyl groups (OH), so the moisture or hydroxyl groups (OH) existing in the soot accumulation layer 41a or the tube 10 is not satisfactorily removed.

The dehydration gas (particularly, $Cl_2$) is reacted with moisture or hydroxyl groups (OH) existing in the soot accumulation layer 41a or the tube 10 according to the dehydration reaction as expressed in the following reaction formula 3.

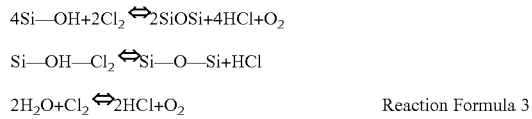

Reaction Formula 3

Figure 6C:
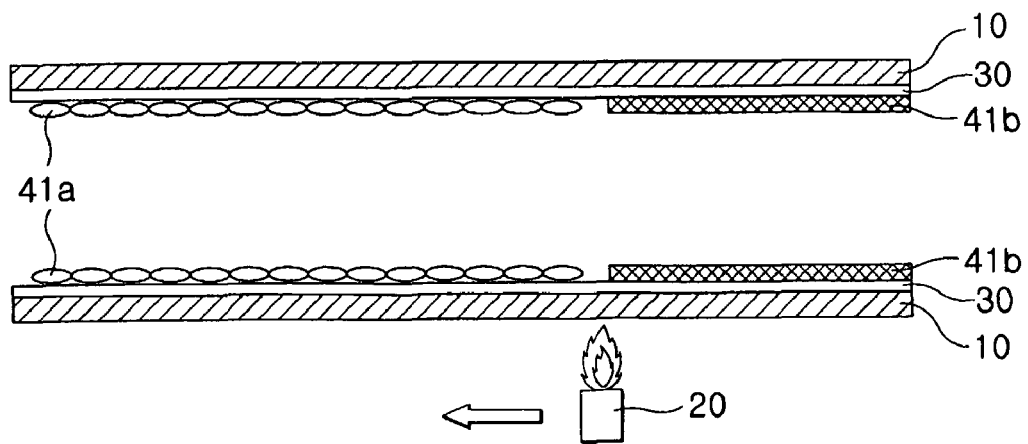

After the dehydration step, the quartz tube 10 experiences the sintering and vitrifying step as shown in FIG. 6c to form a hollow preform in which the clad layer 30 and the base core layer 41 are formed.

That is to say, after the dehydration step is completed, the heat source 20 is moved in an arrow direction of FIG. 6c to keep a temperature of the inside of the tube 10 over 1700° C. so that the soot 41a accumulated on the clad layer 30 is sintered and vitrified to form a sintered layer 41b.

At this time, the heat source 20 preferably moves at a speed of 500 mm/min or less along the length of the quartz tube (see the arrow of FIG. 6c). If the moving speed of the heat source 20 is greater than 500 mm/min, the particles deposited to the inner wall of the tube are not uniformly vitrified to cause distortion on the deposition surface.

In addition, when the sintering step of FIG. 6c is progressed, it is also possible to put dehydration gas such as He, $Cl_2$ and $O_2$ into the tube so as to additionally remove residual hydroxyl groups (OH) or moisture remained without reaction.

(2) Forming an Additional Core Layer

Figure 6D:
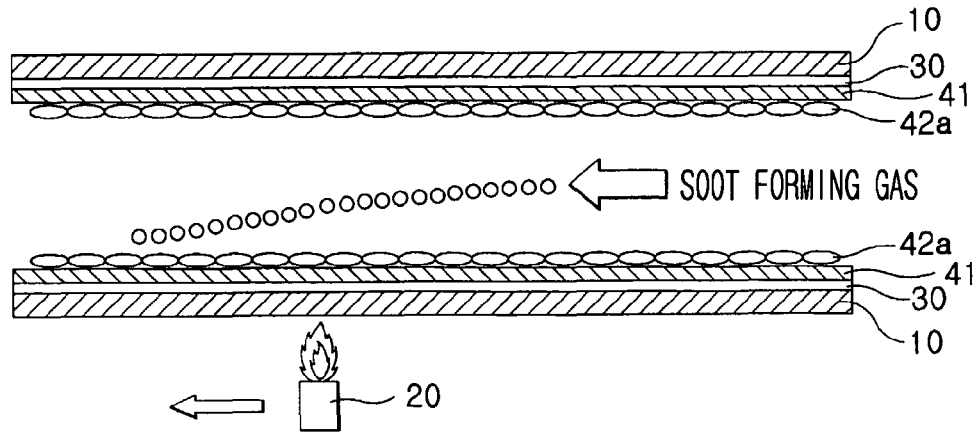
Figure 6E:
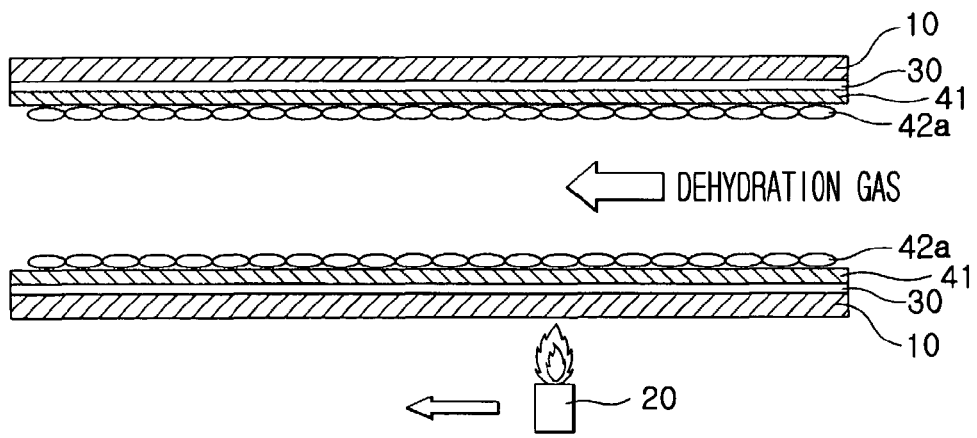
Figure 6F:
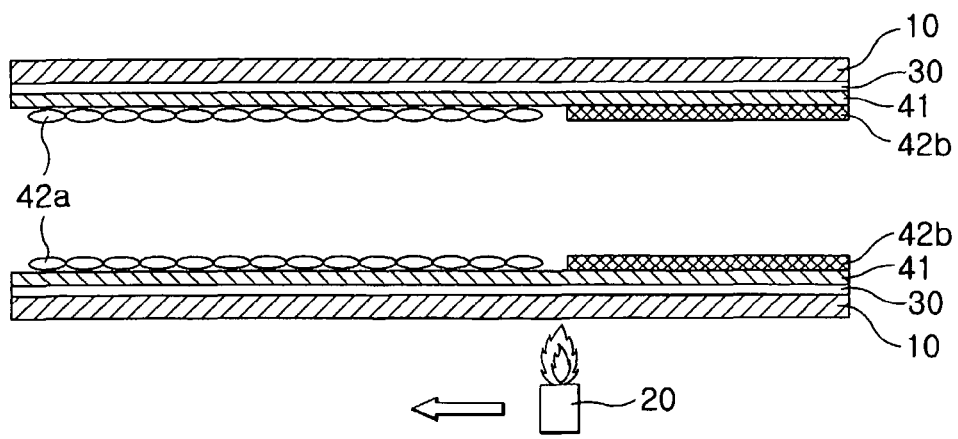

With the base core layer 41 being formed on the inner wall of the quartz tube by executing the steps of FIGS. 6a to 6c subsequently, the steps of FIGS. 6d to 6f may be repeated several times to form at least one additional core layer 42 on the base core layer 41.

Such an additional core layer 42 may be a single layer on the base core layer 41, but preferably at least two layers are formed.

This additional core layer is also formed by repeating the accumulation step (see FIG. 6d), the dehydration step (see FIG. 6e) and the sintering and vitrifying step (see FIG. 6f), like the process of forming the base core layer 41.

Figure 7:
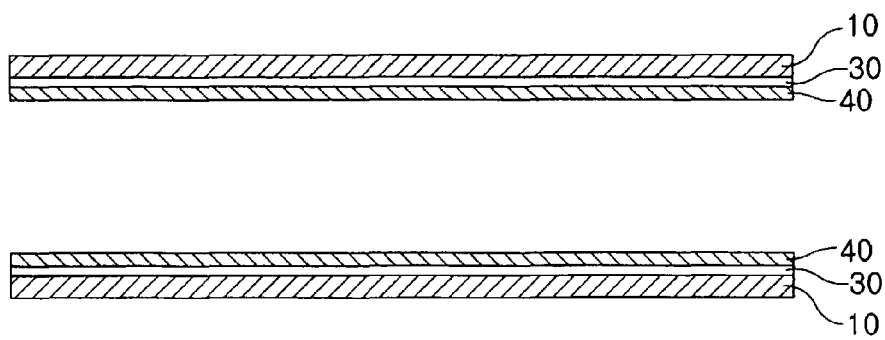
FIG. 7 is a sectional view showing a hollow preform where a clad layer and a core layer are deposited on an inside of a quartz tube according to a preferred embodiment of the present invention.

As mentioned above, by conducting the clad layer forming process (or, forming the base clad layer and the dehydrated clad layer) and the core layer forming process (or, repeating the accumulation→dehydration→sintering steps several times), a hollow preform where the clad layer 30 and the core layer 40 are deposited on the inner wall 10 of the quartz tube as shown in FIG. 7 may be formed.

At this time, the core layer and the dehydrated clad layer corresponding to a part of the clad layer have concentration of hydroxyl groups (OH) restrained below 0.8 ppb by means of the accumulation→dehydration→sintering steps.

The hollow member fabricated as above is formed into an optical fiber preform rod by means of the known collapsing process.

The clad layer forming process, the core layer forming process and the collapsing process are successive procedures conducted using the same equipment and the same heat source.

In the present invention, the heat source 20 used for the clad layer forming process, the core layer forming process and the collapsing process may be modified in various ways, and for example various heating means such as oxygen-hydrogen burners, plasma torches and electric-resistance furnaces may be used.

Since hydroxyl groups (OH) included in the tube and hydroxyl groups (OH) permeated into the tube by the oxygen/hydrogen burner may be penetrated into the core layer by means of dispersion, the clad layer is preferably deposited in great thickness when the clad and core layers are deposited, in order to prevent such penetration of hydroxyl groups (OH). For example, the clad layer is preferably deposited to have a diameter ratio of the clad layer to the core layer equal to or more than 2.0 after the collapsing process, and to have a diameter ratio of the final optical fiber preform to the core layer equal to or more than 3.0.

At this time, it is preferred that the core layer has a thickness of 6.0 mm or more, the clad layer has a thickness of 12.0 mm or more, and the optical fiber preform has a final diameter of 20.0 mm or more.

From the optical fiber preform produced by the present invention, an optical fiber may be drawn using a common drawing process.

The optical fiber drawn as mentioned above has a structure as shown in FIG. 4b, where concentration of hydroxyl groups (OH) in the MFD region is controlled below 0.8 ppb.

Figure 8:
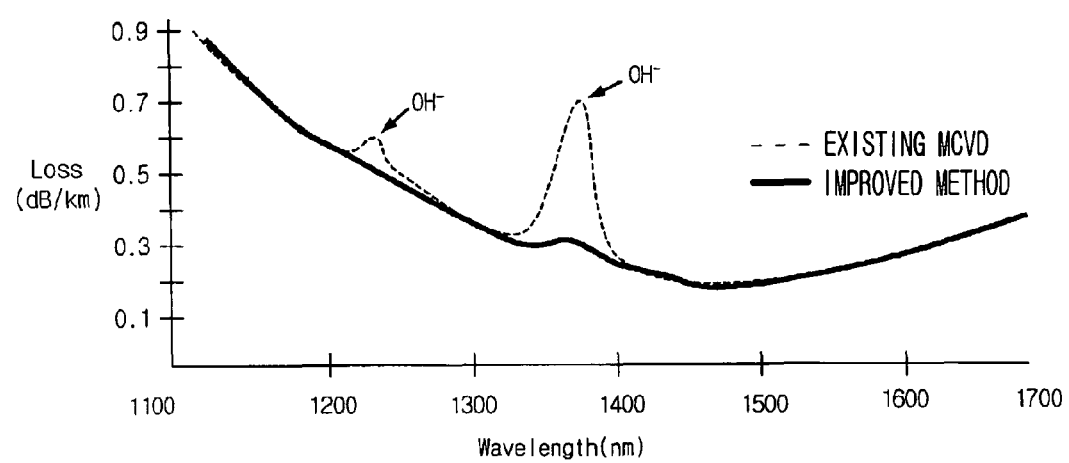
FIG. 8 is a graph for showing absorption losses with respect to a wavelength range of the optical fiber core layer produced by the prior art and the present invention respectively, for comparison.

Optical losses of the optical fiber produced according to the method of the present invention are shown in FIG. 8.

FIG. 8 shows optical losses in the wavelength range of 1100 nm to 1700 nm generated from an optical fiber core, where a dotted line shows optical losses of a conventional optical fiber currently used and a solid line shows optical losses of an optical fiber produced by the improved method of the present invention.

As seen from FIG. 8, the optical fiber produced using the method of the present invention shows an optical loss caused by $OH^-$ groups at 1385 nm lower than 0.33 dB/Km, which is remarkably reduced in comparison to the conventional one, and also shows optical losses caused by scattering at 1310 nm and 1550 nm respectively lower than 0.34 dB/Km and 0.20 dB/Km, which are improved rather than the existing single-mode optical fiber.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The optical fiber produced according to the method of the present invention has concentration of hydrogen ions less than 0.8 ppb in the MFD region (including the core and a part of clad).

Thus, this optical fiber is dehydrated in the MFD region where light substantially passes through, which may improve loss characteristics in the wavelength range of 1340 to 1460 nm in comparison to an optical fiber whose core is just dehydrated.

What is claimed is:

1. A method for producing an optical fiber preform using MCVD (Modified Chemical Vapor Deposition), comprising:
   (a) forming at least one base clad layer by depositing soot including $SiO_2$ and $GeO_2$ on an inner wall of a quartz tube and heating the quartz tube with the soot deposited at a high temperature;
   (b) forming at least one dehydrated clad layer with a refractive index substantially identical to that of the base clad layer by repeating the following steps at least once:
      an accumulation step for introducing a soot forming gas into the quartz tube together with a carrier gas and heating an inside of the quartz tube to a temperature of 1000° C. to 1400° C. to generate soot including $SiO_2$ and $GeO_2$, and then accumulating the soot on the base clad layer;
      a dehydration step for introducing a dehydration gas into the quartz tube and heating the inside of the quartz tube to a temperature of 600° C. to 1200° C. to remove hydroxyl groups (OH) and moisture in the soot and the quartz tube; and
      a sintering step for heating the inside of the quartz tube with the soot deposited at a temperature higher than 1700° C. so that the soot is sintered and vitrified,
   (c) forming at least one core layer with a relatively higher refractive index on the clad layer by repeating the following steps at least once:
      an accumulation step for introducing a soot forming gas into the quartz tube together with a carrier gas and heating the inside of the quartz tube to a temperature of 1000° C. to 1400° C. to generate soot, and then accumulating the soot on the dehydrated clad layer;
      a dehydration step for introducing a dehydration gas into the quartz tube and heating the inside of the quartz tube to a temperature of 600° C. to 1200° C. to remove hydroxyl groups (OH) and moisture in the soot and the quartz tube; and
      a sintering step for heating the inside of the quartz tube with the soot deposited at a temperature higher than 1700° C. so that the soot is sintered and vitrified.

2. The method for producing an optical fiber preform according to claim 1,
   wherein a dehydration region composed of the dehydrated clad layer and the core layer includes a corresponding MFD (Mode Field Diameter) region of the preform corresponding to an MFD region of an optical fiber.

3. The method for producing an optical fiber preform according to claim 1, wherein the soot forming gas is $SiCl_4$ or $GeCl_4$.

4. The method for producing an optical fiber preform according to claim 1,
   wherein the accumulation step, the dehydration step and the sintering step are conducted as a successive procedure with the quartz tube being exposed to a moving heat source.

5. The method for producing an optical fiber preform according to claim 4,
   wherein the heat source is selected from the group consisting of an oxygen-hydrogen burner, a plasma torch and an electric resistance furnace.

6. The method for producing an optical fiber preform according to claim 1,
   wherein a dehydration gas is introduced into the quartz tube during the sintering step so as to additionally remove residual moisture and hydroxyl groups (OH).

7. The method for producing an optical fiber preform according to claim 1, wherein the dehydration gas includes at least one of He, $Cl_2$ and $O_2$.

8. The method for producing an optical fiber preform according to claim 1, wherein the carrier gas is oxygen.

9. The method for producing an optical fiber preform according to claim 1,
   wherein a dehydration region composed of the dehydrated clad layer and the core layer is substantially a corresponding MFD region of the preform corresponding to an MFD region of an optical fiber.

10. A method for producing an optical fiber, comprising:
    collapsing the optical fiber preform produced using the method defined in claim 1 to form a preform rod; and
    drawing the preform rod into an optical fiber.

11. The method for producing an optical fiber according to claim 10, wherein concentration of hydroxyl groups (OH) in an MFD region of the optical fiber is less than 0.8 ppb.

12. A single-mode optical fiber including a core positioned at a central axis for photoconduction, and a dehydrated clad and a base clad subsequently coated on the core,
    wherein the dehydrated clad and the base clad have substantially identical refractive index, and the core has a refractive index greater than the dehydrated clad and the base clad,
    wherein the dehydrated clad has concentration of hydroxyl groups relatively lower than the base clad,
    wherein a region composed of the core and the dehydrated clad includes an MFD region of an optical fiber, and
    wherein the concentration of hydroxyl groups (OH) in the MFD region of the optical fiber is less than 0.8 ppb.

13. The single mode optical fiber according to claim 12,
    wherein a region composed of the core and the dehydrated clad is substantially the MFD region of the optical fiber.

* * * * *